Dec. 12, 1939.  E. BACH  2,183,002
ACCELEROMETER
Filed Oct. 2, 1936
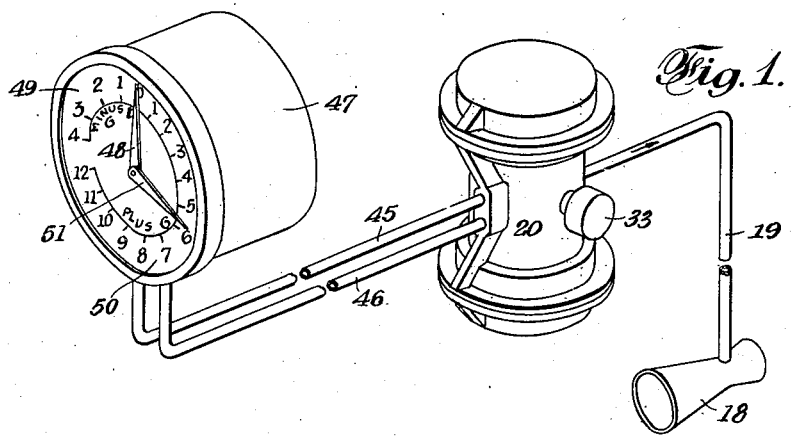
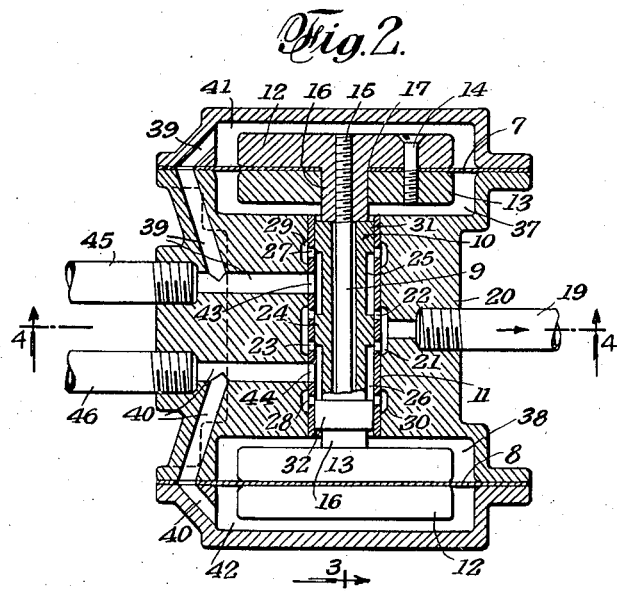
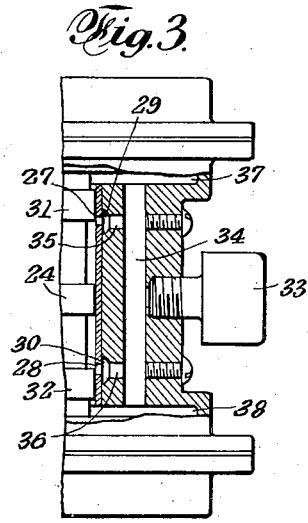
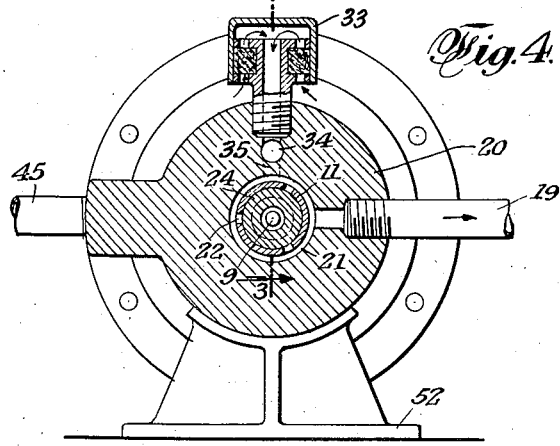
EMMON BACH
INVENTOR
BY *Philip S. McLean*
ATTORNEY Patented Dec. 12, 1939

2,183,002

UNITED STATES PATENT OFFICE 2,183,002

ACCELEROMETER

Emmon Bach, Yonkers, N. Y., assignor, by mesne assignments, to National Aviation Research Corporation, New York, N. Y., a corporation of Delaware Application October 2, 1936, Serial No. 103,628

4 Claims. (Cl. 264—1)

The invention herein disclosed relates to the measurement of forces, such as acceleration, pressure, weight, tension, or other values susceptible of translation into some form of force.

One of the objects of the invention is to enable the measurement of force with an accuracy which is independent of the work required to indicate or to record such measurement.

Another object is to provide apparatus with which remote indication, recording or control may be effected without affecting the accuracy of measurement of the force to be indicated or recorded, or with which it is desired to effect some control.

Other objects of the invention and the novel features by which all objects are attained are set forth and will appear in the course of the following specification.

The drawing accompanying and forming part of the specification illustrates one practical embodiment of the invention, but it will be understood that the structure, arrangement and use of the invention may all be varied within the true spirit and broad scope of the invention as hereinafter set forth and broadly covered in the claims.

Figure 1 is a broken perspective view of an embodiment of the invention designed and in use as an accelerometer.

Figure 2 is a broken central sectional view of the same on a larger scale.

Figure 3 is a similar broken sectional view in a different vertical plane.

Figure 4 is a broken horizontal cross sectional view on substantially the plane of line 4—4 of Figure 2.

In the form of the invention disclosed, as illustrated in Figures 1 to 4, where the forces to be determined may be of opposite sign, the device is constructed with two flexible diaphragms 7, 8 connected by a rod 9, carrying a piston valve 10 operating in a valve sleeve 11.

These two diaphragms are weighted in the illustration, each by discs 12, 13 at opposite faces of the same, secured together over the diaphragm by through screws 14 and the connecting rod is shown as secured to the weighted diaphragms by having screw engagement at 15 at its opposite ends in hub portions 16 of the outer discs projecting through corresponding openings 17 in the diaphragms and inner discs. These, however, are simply convenient, practical ways of properly securing these parts together.

The valve 10 should be free to slide in the valve sleeve without any binding or cramping action from the diaphragms or the intervening connecting rod 9. For this reason said valve is shown formed as a sleeve loosely surrounding the rod 9 and having its opposite ends in contacting but not clamped engagement with the opposing inner ends of the hub portions 16.

In the form of the invention under consideration, suction is employed as the force for establishing the balance of the instrument and the source of such suction is indicated as a venturi 18, connected by tube 19 with an intermediate portion of the instrument body 20, between the diaphragms. Actually, as shown in Figure 2, the suction line connects with an annular chamber 21 surrounding the central portion of the valve sleeve 11 and the latter is shown as having ports 22, 23 controlled by the intermediate annular shouldered portion 24 of the valve. Above and below this valve shoulder the valve body is reduced in diameter to provide annular chambers 25, 26, connecting by sleeve ports 27, 28 with surrounding annular chambers 29, 30. The valve body is shown as having upper and lower valve heads 31, 32 controlling these upper and lower ports.

Figures 3 and 4 show how air is admitted through a suitable filter 33 to a passage 34 ported at 35, 36 to provide communication with the upper and lower annular chambers 29, 30 and opening at opposite ends to the chambers 37, 38 at the inner sides of the diaphragms. This construction thus equalizes pressure on the inside faces of the diaphragms as well as providing flow to the chambers 29, 30 at opposite ends of the valve.

The outer faces of the diaphragms are subjected to suction through passages 39, 40, Figure 2, extending from the outer diaphragm chambers 41, 42 to the sleeve ports 43, 44, opening to the valve clearance spaces 25, 26.

From passages 39, 40, tubes 45, 46 are shown extended to the opposite sides of the differential pressure gage 47 and the latter is indicated as having a pointer 48 reading on "Minus G" and "Plus G" scales 49, 50 respectively. This instrument is also shown as equipped with a maximum reading pointer 51, but it will be appreciated that such details are unimportant and are referred to merely for more complete understanding of the present invention.

When used as a meter for measurement of acceleration forces of an airplane, the unit is mounted rigidly as by means of the bracket construction 52, Figure 4, preferably at the center of gravity of the ship and with its axis, as represented by the center connection 9, in the direction in which the forces are to be measured. So mounted and connected as illustrated, suction created by the venturi will cause air to be drawn in through the filter 33 into the end channels or chambers 29, 30 and through ports 27, 28, where it is throttled by the upper and lower valve heads 31, 32 into the valve chambers 25, 26, and then through ports 22, 23 where it is again throttled by the intermediate valve head 24 into suction chamber 21.

Under static conditions the weights 12, 13 will depress the diaphragms, causing the latter to shift the valve downwardly, producing closure or partial closure of ports 27 and 23 and the opening of ports 28 and 22. This unbalances pressure in the annular valve chambers 25 and 26, causing chamber 25 to approach suction pressure and chamber 26 to approach atmospheric pressure. Suction is thus applied to the upper face of the upper diaphragm through passage 39 to a greater extent than to the lower diaphragm and sufficient to sustain the combined weight, with the valve approximately in the intermediate balanced position illustrated in Figure 2. This unbalanced pressure in pounds per square inch times the effective diaphragm area equals the weight and may be so recorded by the differential gage or the latter may be compensated so as to show a zero reading.

Any increased weight on the diaphragms, applied physically or through acceleration forces will cause a shifting of the pilot valve to create a differential pressure in lines 45—46, proportional to the applied force. This compensating pressure admitted to the diaphragm chambers 41 and 42 opposes and limits movement of the valve, acting in effect as a restoring force. The extent of such restoring force will be directly shown by the differential gage which through the lines 45, 46 is subjected to the same unbalancing and restoring forces. Negative forces will cause unbalance in the opposite direction and consequent actuation of the gage in the reverse direction. The latter, it will be appreciated, may be of the plain indicating or the recording type and should be compensated for acceleration forces.

The device may so be considered as a small differential pressure regulator responding to varying forces and through the medium of the gage or indicator providing accurate knowledge of the value of such forces.

With the double diaphragm construction, the diaphragms are under stress always in the same direction and an insensitive zero point is thus avoided. Stuffing boxes and errors consequent therefrom through friction, etc., are entirely eliminated. Both positive and negative values of "G" are obtained.

For measurement of weights which are always positive or for differential pressures which are always of the same sign, only one set of ports is needed and the values may be read on a vacuum gage with atmospheric pressure as the base level.

Compressed air or equivalent may be employed, with slight modifications, in place of suction.

The instrument is instantly responsive, particularly sensitive and accurately indicates the desired values or effects the desired controls. The diaphragms when subjected to the force which is to be measured, immediately react to create a compensating pressure, which is directly indicated or recorded on the gage or indicator or is utilized to effect a desired control. The gage, indicator or controller may be remotely or closely connected with the instrument so that the invention is well suited for remote indicating or control purposes. As shown, the diaphragms and all moving parts may be completely enclosed.

The structure may be modified and changed in various ways. The invention may be applied to many other uses than those mentioned. For example, the buoyancy of a partially submerged float acting on the diaphragm stem may be used to provide information of liquid level without substantial movement of such a float.

What is claimed is:

1. In an instrument of the character disclosed, the combination of opposed diaphragms, a rigid connection between the same, a self-centering valve piloted in self-adjusting relation on said rigid connection between said diaphragms and a casing enclosing said diaphragms and self-centering valve, including chambers in which the diaphragms are located, a valve chamber between the diaphragm chambers in which said valve is self-adjusting, passages from said diaphragm chambers to said valve chamber controlled by said valve, a fluid pressure passage to the valve chamber also controlled by said valve and external connections to the respective passages, said diaphragm chamber passages extending from the outermost sides of the diaphragm to the intermediate valve chamber and a pressure balancing passage connecting the diaphragm chambers at the inner faces of the diaphragms.

2. In an instrument of the character disclosed, the combination of opposed connected diaphragms, a valve interposed between and actuated from said diaphragms, a casing enclosing said diaphragms and valve, including chambers in which said diaphragms are located, a valve chamber between said diaphragm chambers in which said valve operates, passages between said valve chamber and the individual diaphragm chambers controlled by said valve, passages between the outside air and said first mentioned diaphragm passages and controlled by said valve in reverse order to the control exercised by said valve over said first mentioned passages, a fluid pressure passage to said valve chamber and external differential pressure connections extending from said first mentioned diaphragm passages.

3. An accelerometer, comprising, an accelerometer casing disposed on a substantially vertical axis, substantially horizontally disposed weighted diaphragms in the upper and lower portions of said vertically arranged casing, a vertically extending connection between said diaphragms, a slide valve carried by said connection, an intermediate and two end valve chambers controlled by said slide valve, a venturi connected with said intermediate valve chamber, differential pressure connections extending from said end valve chambers, a differential pressure instrument connected with and controlled by said differential pressure connections, passages extending from said differential pressure connections to said diaphragms and said casing having an air inlet to said end valve chambers controlled by said slide valve.

4. An accelerometer, comprising, an accelerometer casing mounted on a substantially vertical axis, substantially horizontal weighted diaphragms in the upper and lower end portions of said casing, a connection between said diaphragms, a slide valve carried by said connection, an intermediate and two end valve chambers controlled by said slide valve, means connected with said intermediate valve chamber for supplying an actuating pressure force, a differential pressure instrument, differential pressure connections from said end valve chambers to said differential pressure instrument and differential pressure passages extending from said valve controlled pressure connections to said diaphragms respectively.

EMMON BACH.